(No Model.)

W. WATTIE.
CONNECTING ROD.

No. 367,566. Patented Aug. 2, 1887.

Witnesses
M. Ralph Dryden
Laura Harper

Inventor William Wattie
per John C. Dewy Attorney

UNITED STATES PATENT OFFICE.

WILLIAM WATTIE, OF WORCESTER, MASSACHUSETTS, ASSIGNOR TO THE KNOWLES LOOM WORKS, OF SAME PLACE.

CONNECTING-ROD.

SPECIFICATION forming part of Letters Patent No. 367,566, dated August 2, 1887.

Application filed April 15, 1887. Serial No. 234,880. (No model.)

*To all whom it may concern:*

Be it known that I, WILLIAM WATTIE, a citizen of the United States, residing at Worcester, in the county of Worcester and State of Massachusetts, have invented certain new and useful Improvements in Connecting-Rods; and I do hereby declare that the following is a full, clear, and exact description thereof, which, in connection with the drawings making a part of this specification, will enable others skilled in the art to which my invention belongs to make and use the same.

My invention relates to connecting-rods in which the bearings with the cranks or pins connected are formed by the ends of the main body of the connecting-rod combined with bearing-straps attached thereto, the ends of the main body of the connecting-rod being shaped to fit the cranks or pins against which they are to bear and the bearing-straps being also bent or shaped to complete the bearings.

The object of my invention is to provide a cheap, quick, convenient, and desirable method of drawing the bearing-straps of the connecting-rod toward the central part of the connecting-rod at one or both ends thereof after said rod has been placed in position, in order to secure good bearings of the connecting-rod with the cranks or pins which it connects, and to do this without removing the bolts which secure the bearing-straps to the connecting-rod, it being desirable that the bearings should be easily and quickly adjusted, so as to be free from any looseness, but not too tight to prevent the machine, of which the connecting-rod forms a part, from operating in a satisfactory manner; and my invention consists in certain novel features of construction and combination of parts of the connecting-rod to accomplish the object above set forth in the manner to be hereinafter fully described.

Figure 1:
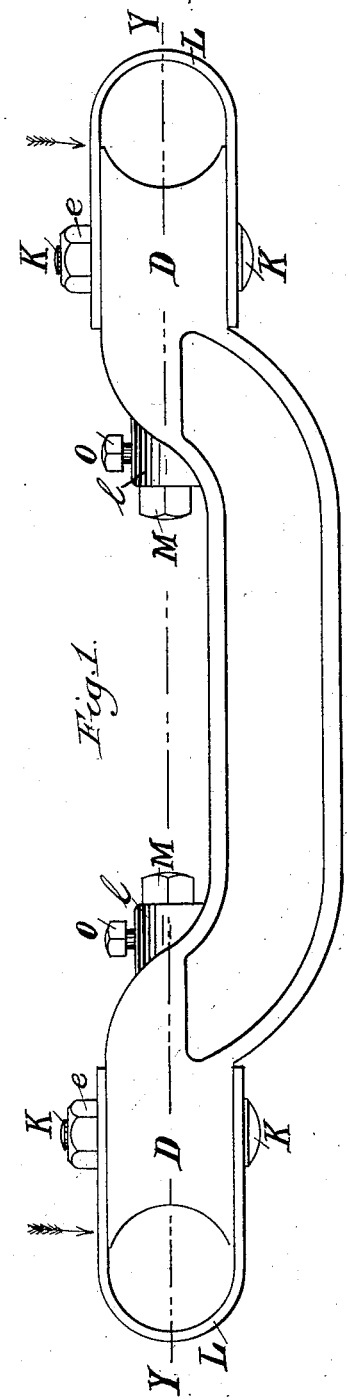
Figure 2:
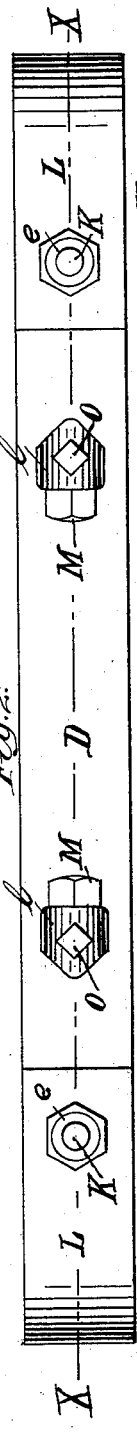
Figure 3:
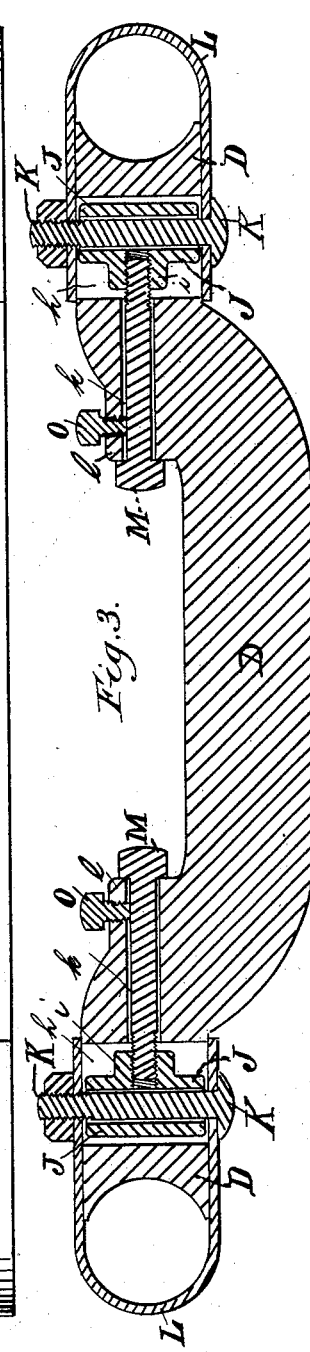
Figure 4:
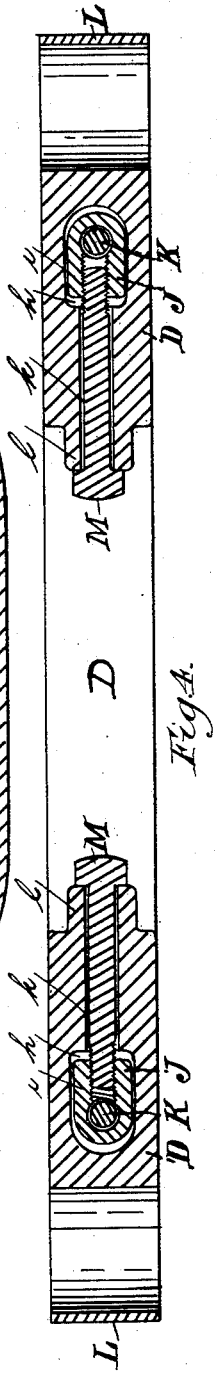

Referring to the drawings, Figure 1 represents a side elevation of my improved connecting-rod. Fig. 2 is a plan view looking in the direction of the arrow, Fig. 1. Fig. 3 is a vertical longitudinal section taken on line $x\,x$, Fig. 2; and Fig. 4 is a horizontal cross-section taken on line $y\,y$, Fig. 1, looking in the direction of the arrow, same figure.

My connecting-rod consists of the main body D, the bearing-straps L at each end thereof, the strap-bolts K, the adjustable T-shaped pieces J, supported and inclosed within the main body D, and the adjusting-screws M and set-screws $o$.

The main body D of the connecting-rod is preferably made of iron of any desired size and length, and of substantially the shape shown in the drawings, having its ends cut or shaped out to the form of the crank or pin against which they are to bear.

The bearing-straps L extend over each end of the main body D of the connecting-rod and are held by the strap-bolts K, which extend through holes therein. (See Fig. 3.) When the nuts $e$ of the strap-bolts K are screwed down, the bearing-straps L are firmly held against the main body D of the connecting-rod.

The bearing-straps L are drawn toward the main body or central part of the connecting-rod to make good bearings by means of the adjusting-screws M and adjustable T-shaped pieces J. The T-shaped pieces J are contained and supported within holes $h$ in the main body D of the connecting-rod near each end thereof. (See Figs. 3 and 4.)

The strap-bolts K pass through holes in the main part or central bore of the T-shaped pieces J. (See Fig. 3.) The branch pipes $i$ of the pieces J are provided with an internal screw-thread adapted to engage the inner ends of the adjusting-screws M, which are screwed into them. (See Figs. 3 and 4.)

The adjusting-screws M pass through and turn in holes $k$, made in the main body D of the connecting-rod. The heads of said screws bear against hubs or projections $l$, extending up from and forming a part of the main body D.

The T-shaped pieces J, holding the strap-bolts K, by means of which the bearing-straps L are connected with said pieces J, are drawn in toward the central part of the connecting-rod by turning the adjusting-screws M, the heads of said screws bearing against the hubs or projections $l$, as before stated, and the ends of the bearing-straps L sliding upon the upper and lower sides of the ends of the main body D of the connecting-rod. (See Figs. 1 and 3.)

When the bearing-straps L are properly adjusted or drawn in, so as to give satisfactory bearings, by means of the adjusting screws M, in connection with the T-shaped pieces J, as above described, the nuts e of the bolts K are screwed hard down to hold the bearing-straps L in the desired position, and the set-screws o are turned down to prevent the adjusting-screws M from turning when the machine is running.

I have illustrated in the drawings and described my connecting-rod having an adjustable bearing-strap at each end thereof and means for adjusting the same, and I prefer this construction; but, if desired, only one of the bearing-straps may be made adjustable at one end of the connecting-rod and the other bearing-strap be secured to the other end of the connecting-rod in any ordinary manner.

Having thus described my invention, what I claim as new, and desire to secure by Letters Patent, is—

1. A connecting-rod provided with an adjustable T-coupling supported and inclosed within one or both ends thereof, a holding-bolt passing through said coupling and the ends of the bearing-strap, said bearing-strap, and means consisting of a screw supported in and having its bearing against the main body of the connecting-rod for adjusting the position of the T-coupling and the bearing-strap connected therewith, substantially as set forth.

2. In a connecting-rod, an adjustable T-shaped piece connected with the bearing-strap by a bolt passing through the ends of said strap and through said T-shaped piece, in combination with means for drawing in and adjusting said bearing-strap, substantially as set forth.

3. In a connecting-rod, the combination, with an adjustable T-shaped piece supported and inclosed within the end thereof and holding the bolt of the bearing-strap, of an adjusting-screw supported in and having its bearing against the main body of the connecting-rod, and connected at its inner end with said T-shaped piece to adjust the position thereof, substantially as set forth.

4. In a connecting-rod, the combination, with the main body D, provided with holes h and k at one or both ends thereof, and adjustable T-shaped pieces J, of bearing-straps L, strap-bolts K, passing through said pieces J, and adjusting-screws M, combined together and operated substantially as set forth.

WILLIAM WATTIE.

Witnesses:
JOHN C. DEWEY,
M. RALPH DRYDEN.